Oct. 26, 1965   A. SENKOWSKI ETAL   3,213,706
BRAKE CONTROL MECHANISM
Filed Jan. 11, 1963   2 Sheets-Sheet 1
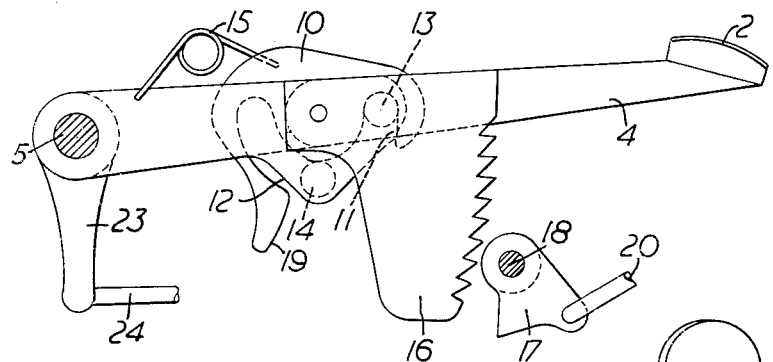
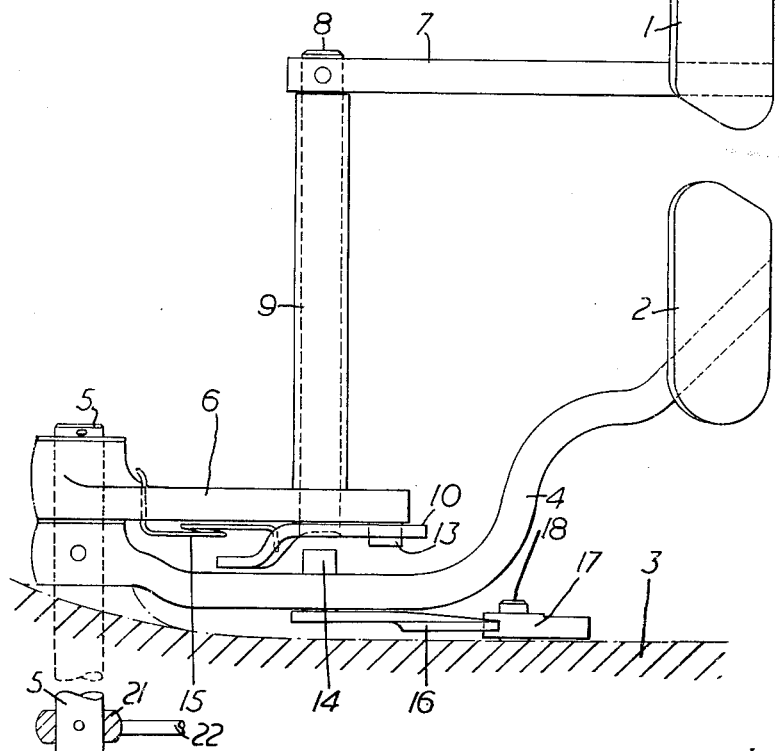
Inventors
ALEXANDER SENKOWSKI
BRUCE L. COSH
By *Imirie & Smiley*
Attorneys Oct. 26, 1965  A. SENKOWSKI ETAL  3,213,706
BRAKE CONTROL MECHANISM
Filed Jan. 11, 1963
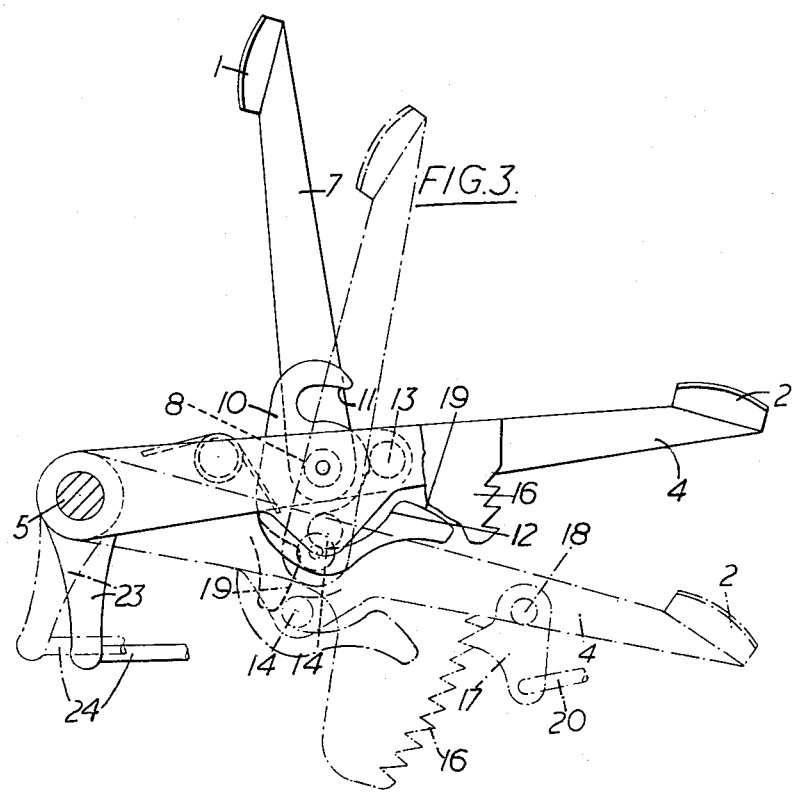
Inventors
ALEXANDER SENKOWSKI
BRUCE L. COSH
By *Emrich & Smiley*
Attorneys United States Patent Office 3,213,706
Patented Oct. 26, 1965

1

3,213,706
BRAKE CONTROL MECHANISM
Alexander Senkowski, Coventry, and Bruce Lionel Cosh, Kenilworth, England, assignors to Tractor Research Limited, "Abbotswood," Stow-on-the-Wold, Gloucestershire, England, a company of Great Britain
Filed Jan. 11, 1963, Ser. No. 250,920
Claims priority, application Great Britain, Mar. 7, 1962, 8,834/62
5 Claims. (Cl. 74—478.5)

This invention relates to brake control mechanism for vehicle rear wheel brakes adapted for independent or coupled operation.

Some forms of vehicles, particularly tractors, are provided with brake control levers which permit the brakes for the rear wheels to be used either independently or coupled. As is well understood, the coupled control system is usually employed when the tractor is being driven along a road, and the independent control system is used when the tractor is working in a field.

Heretofore the methods employed for effecting the coupling of the brake lever controls have had a number of disadvantages. For example, with the known devices a hand-controlled latch is employed and this is located in a position such that it can be contaminated by mud and field debris which make it stiff to operate or adjust, and the position is also such that the driver usually has to dismount from the tractor in order to operate the latch or has to assume a contorted, uncomfortable position in order to operate the latch. Further, with the known devices it is found that when the tractor is on the move there is a possibility for the coupled system to revert to independent action because the latching device is not locked in the selected condition thereof, and the driver cannot be certain of the exact position of the device when it is covered with mud and debris.

It is a main object of the present invention to provide a brake control mechanism which avoids the above-mentioned disadvantages and which is capable of providing an instantly operable lever arranged to select coupled braking with one movement and independent braking with another, which can be operated by the driver without discomfort or dismounting from his seat, which provides for a single pedal control when the brakes are coupled, and which will give the driver instant recognition as to whether the brakes are conditioned for coupled or independent operation. The mechanism may also provide for the positive coupling of the controls in a manner which will not be disturbed under normal conditions of service unless a re-selection is made by the driver, and incorporate a device ensuring that when a parking latch is employed both brake-operating levers must be in a datum position thereof before they can be coupled.

According to the invention there is provided brake control mechanism for vehicle rear wheel brakes adapted for independent or coupled operation, comprising a left-hand and a right-hand brake-operating lever connectable respectively with the left- and right-hand rear wheel brakes of a vehicle and supported for rocking movement about an axis common thereto, foot-pedals carried one by each of the brake-operating levers and supported thereby in side-by-side relation at a common level when the levers are in a datum position thereof and are conditioned for independent operation, and latching means operable by rotation of one brake-operating lever to couple said one brake-operating lever to the other brake-operating lever for operation therewith by the pedal carried thereby.

In order that the invention may be clearly understood one embodiment thereof will now be described, by way of example, with reference to the accompanying drawings, in which:

2

FIG. 1 is a side elevation of brake control mechanism according to the invention,
FIG. 2 is a top plan of FIG. 1, and
FIG. 3 is a view similar to FIG. 1 but illustrating the mode of operation of the control mechanism.

Referring to the drawings, foot pedals 1, 2 are located on the right-hand side of the tractor 3, as viewed from the driver's seat and are carried respectively one by a right-hand and one by a left-hand rotatable brake-operating lever and are located in side-by-side relation and at a common level, FIGS. 1 and 2, when the levers are in a datum position thereof, in which position the brakes are released, and are conditioned for independent operation. The pedal 2 is to operate the brake, not shown, for the left-hand rear wheel of the tractor 3 and is carried by the left-hand brake-operating lever 4 which is secured to a shaft 5 rotatable in bearings carried by the tractor frame and which extends through the tractor to the left-hand side thereof. The left-hand end of the shaft 5 has a drop arm 21 rigidly attached thereto and a brake-operating drag link 22, FIG. 2, is connected to the arm 21 to effect operation of the left-hand rear brake of the tractor.

The first pedal 1 is carried by the right-hand brake-operating lever which lever comprises a first arm 6 which is freely rotatable on shaft 5 but which can, as described below, be coupled to lever 4 for rotation therewith, and a second arm 7 which is arranged to be rotatable with and relative to the first arm 6. The second arm 7 is secured to a shaft 8 freely rotatable in a tube 9 which is secured, as by welding, to the first arm 6. Pedal 1 is carried by the second arm 7. A second drop arm 23, FIGS. 1 and 3, similar to arm 21, is movable with the first arm 6 and has attached thereto a second drag link 24 which operates the right-hand rear brake of the tractor.

Latching means for coupling the right-hand and left-hand brake-operating levers comprises a latch member 10 which is rigidly attached to shaft 8 to be rotatable with the second arm 7 and the latch member 10 is provided with two slots 11, 12, FIGS. 1 and 3, arranged for selective co-operation with a first abutment 13 carried by the first arm 6 or with a second abutment 14 carried by the left-hand brake-operating lever 4. A spring 15 co-operates with the first arm 6 and the latch member 10 to retain the latch in co-operation with the selected abutment 13 or 14.

With the pedals 1, 2 in the datum positions thereof, FIGS. 1 and 2, the pedals 1, 2 can be operated independently to control the rear wheel brakes of the tractor. When the pedals are to be coupled the driver places the toe of his boot beneath the pedal 1 and flicks the pedal upwards so that the second arm 7 is rotated through about 90° to the position thereof shown in full lines in FIG. 3, this movement of arm 7 being assisted by the spring 15. Rotation of the arm 7 to the full-line position thereof causes the slot 11 to be disengaged from abutment 13 and the slot 12 to be engaged with the abutment 14 thus coupling the right-hand brake-operating lever 6, 7 to the left-hand lever 4. Now operation of pedal 2 will cause simultaneous rocking of the two brake-operating levers. Should the driver wish to return to independent brake operation he depresses arm 7 with a foot and so restores the arm to the datum position thus reversing the action of the latch member 10 and recoupling slot 11 and abutment 13. It will be understood that the position of the arm 7 gives the driver instant recognition as to whether the brakes are conditioned for independent or coupled operation.

The mechanism includes provision for retaining both of the left and right hand brakes in their fully applied conditions for parking purposes. To this end a toothed element 16 is rigidly attached to the left-hand brake-operating lever 4. A pawl 17 pivoted at 18 to the frame of the tractor is operable manually to engage the toothed element 16 and so retain the operating lever 4 in a depressed position with its associated, left-hand, brake applied.

For correct application of the parking brake the pedal 1 and second arm 7 are first swung into the full line position thereof shown in FIG. 3, thus coupling the two brake pedals as described above. Then on depression of lever 4 the right-hand and left-hand brake-operating levers are accordingly moved simultaneously to the parked braking condition thereof, shown in chain lines in FIG. 3, in which the left-hand and right-hand brakes are both applied, and the pawl 17 is then engaged with the toothed element 16 so that both brakes remain applied. The brakes can be released from their parked position by manual tripping of the pawl 17 by means of an actuating member 20, FIGS. 1 and 3.

It is possible for the parking mechanism cooperating with the brake-operating lever 4 to be operated when pedal 1 and arm 7 are in the uncoupled position thereof. In such a case only the left-hand brake would be applied. If such an incorrect manoeuvre is executed by the driver a cam 19 integral with the latch member 10 comes into proximity with the pin 14 in its lower position as shown by dotted lines in FIG. 3. This prevents the driver from swinging pedal 1 upwards and thus mis-matching the latch member 10 and its slot 12 with pin 14. Cam 19, being an extension of member 10, is therefore a safety device to avoid such an occurrence.

From the foregoing it will be understood that by the control mechanism described with reference to and as illustrated in the drawings there is obtained each of the advantages mentioned above as being obtainable by mechanism according to the invention.

We claim:

1. Brake control mechanism for vehicle rear wheel brakes adapted for independent or coupled operation, comprising a left-hand and a right-hand brake-operating lever connectable respectively wtih the left- and right-hand rear wheel brakes of a vehicle and supported for rocking movement about an axis common thereto, foot-pedals carried one by each of the brake-operating levers and supported thereby in side-by-side relation at a common level when the levers are in a datum position thereof and are conditioned for independent operation, and latching means operable by rotation of one brake-operating lever to couple said one brake-operating lever to the other brake-operating lever for operation therewith by the pedal carried thereby.

2. Brake control mechanism for vehicle rear wheel brakes adapted for independent or coupled operation, comprising a left-hand and a right-hand brake-operating lever connectable respectively with the left- and right-hand rear wheel brakes of a vehicle and supported for rocking movement about an axis common thereto, one of said brake-operating levers including a first arm rotatable with the other of the brake-operating levers and a second arm carried by the first arm for rotation therewith and for rotation relative thereto to and from a datum position thereof, a foot pedal carried by said second arm, a pedal carried by said other brake-operating lever, said pedals being supported by the first arm and said other brake-operating lever in side-by-side relation at a common level when said arm and other lever are in datum positions thereof and the left-hand and right-hand brake-operating levers are conditioned for independent operation, a first abutment carried by said first arm, a second abutment carried by said other brake-operating lever, and a latch member rotatable with said second arm and arranged for selective co-operation with said first and second abutments, said latch member co-operating with the first abutment when said one brake-operating lever is in the datum position thereof and with the second abutment on rotation of the second arm to disengage the latch member from the first abutment.

3. Brake control mechanism according to claim 2, including a parking latch co-operable with said other brake-operating lever to retain the lever in the operated, braking, condition thereof during parking, and a safety device operable under control of said latch member to co-operate with said second abutment in the event that said one brake-operating lever is not coupled to said other brake-operating lever on movement thereof to the latched parked condition thereof.

4. Brake control mechanism according to claim 3, wherein the safety device comprises a cam movable with the latch member.

5. Brake control mechanism according to claim 2, including a spring co-operating with said first arm and with the latch member to retain the latch member in co-operation with the first or second abutment as appropriate.

References Cited by the Examiner
UNITED STATES PATENTS

| 2,504,258 | 4/50 | Elenewicz | 74—542 |
| 2,722,847 | 11/55 | Petrochko | 74—478.5 |
| 2,844,046 | 7/58 | Reynolds | 74—542 |

BROUGHTON G. DURHAM, *Primary Examiner.*